US012705011B1

(12) United States Patent
Pascual et al.

(10) Patent No.: US 12,705,011 B1
(45) Date of Patent: Aug. 11, 2026

(54) SYSTEM AND METHOD OF CAPTURING, AUGMENTING, AND DISPLAYING IMAGES OF A USER FROM AN ONBOARD CAMERA VIA A DIGITAL DISPLAY DEVICE WHEN AN OPERATIVELY COUPLED INFORMATION HANDLING SYSTEM IS INACTIVE

(71) Applicant: Dell Products LP, Round Rock, TX (US)

(72) Inventors: Francis Joseppee Pascual, Singapore (SG); Loo Shing Tan, Singapore (SG); Lei Guo, Singapore (SG)

(73) Assignee: DELL PRODUCTS LP, Round Rock, TX (US)

( * ) Notice: Subject to any disclaimer, the term of this patent is extended or adjusted under 35 U.S.C. 154(b) by 0 days.

(21) Appl. No.: 19/192,007

(22) Filed: Apr. 28, 2025

(51) Int. Cl.
*G06F 3/14* (2006.01)
*G06F 3/00* (2006.01)
*G06F 3/0482* (2013.01)

(52) U.S. Cl.
CPC ............ *G06F 3/1462* (2013.01); *G06F 3/005* (2013.01); *G06F 3/0482* (2013.01); *G06F 2203/04803* (2013.01); *G06F 2203/04806* (2013.01)

(58) Field of Classification Search
CPC ...... G06F 3/1462; G06F 3/005; G06F 3/0482; G06F 2203/04803; G06F 2203/04806
See application file for complete search history.

(56) References Cited

U.S. PATENT DOCUMENTS 8,767,030 B2 * 7/2014 Singhal .................. G06F 3/005 455/416
8,767,124 B2 7/2014 Zhu
8,863,187 B2 10/2014 Ho
9,344,673 B1 5/2016 Buchheit
9,552,187 B2 1/2017 Stahl
9,961,265 B2 * 5/2018 Chaudhry ........... H04N 23/631
(Continued)

FOREIGN PATENT DOCUMENTS

CA 3003550 C 4/2024
EP 2757773 B1 6/2020
(Continued)

*Primary Examiner* — Michael Pervan
(74) *Attorney, Agent, or Firm* — Prol Intellectual Property Law, PLLC; H. Kenneth Prol

(57) ABSTRACT

A digital display device including digital signal processing (DSP) hardware controller executing machine readable code instructions of a digital display device augmented mirror system comprising a display panel and an onboard camera. The DSP hardware controller detects absence of an incoming video data signal from an operatively coupled information handling system and receives user selection of an auxiliary mirror mode at the digital display device to display an on screen display (OSD) graphical user interface (GUI) for selection of user modes and to activate the onboard camera and display panel. The onboard camera captures a user image and provides it to the DSP hardware controller to render the user image for display on the display panel. The DSP hardware controller automatically switches to display images pursuant to the incoming video data signal when detected and received from the operatively coupled information handling system and ceases display of the user image.

20 Claims, 7 Drawing Sheets

(56) References Cited

U.S. PATENT DOCUMENTS

| | | | | |
|---|---|---|---|---|
| 10,186,020 | B2 | 1/2019 | Engberg | |
| 10,297,037 | B2 * | 5/2019 | Shin | G09G 5/00 |
| 10,346,122 | B1 | 7/2019 | Morgan | |
| 11,435,974 | B2 | 9/2022 | Lee | |
| 11,526,324 | B2 * | 12/2022 | Zilka | A45D 42/00 |
| 11,681,422 | B2 * | 6/2023 | Rowles | H04N 23/74 348/798 |
| 12,468,498 | B2 * | 11/2025 | Zilka | F04D 27/00 |
| 2007/0040033 | A1 * | 2/2007 | Rosenberg | G06F 3/0481 235/462.36 |
| 2011/0210975 | A1 | 9/2011 | Wong | |
| 2012/0257000 | A1 * | 10/2012 | Singhal | H04N 7/183 348/14.02 |
| 2016/0100097 | A1 * | 4/2016 | Chaudhry | H04N 5/772 348/333.02 |
| 2016/0231918 | A1 * | 8/2016 | Shin | G06F 3/048 |
| 2019/0250781 | A1 * | 8/2019 | Savitski | H04M 1/72436 |
| 2020/0260001 | A1 | 8/2020 | Douady-Pleven | |
| 2022/0011928 | A1 * | 1/2022 | Rowles | H04N 23/74 |
| 2022/0214853 | A1 * | 7/2022 | Zilka | G06F 3/1454 |
| 2023/0115144 | A1 * | 4/2023 | Kao | H04N 23/57 348/369 |
| 2023/0305791 | A1 * | 9/2023 | Zilka | G06F 1/1605 |

FOREIGN PATENT DOCUMENTS

| | | | |
|---|---|---|---|
| EP | 3585037 | B1 | 11/2020 |
| EP | 3599760 | B1 | 2/2023 |

* cited by examiner

SYSTEM AND METHOD OF CAPTURING, AUGMENTING, AND DISPLAYING IMAGES OF A USER FROM AN ONBOARD CAMERA VIA A DIGITAL DISPLAY DEVICE WHEN AN OPERATIVELY COUPLED INFORMATION HANDLING SYSTEM IS INACTIVE

FIELD OF THE DISCLOSURE

The present disclosure generally relates to digital display devices that operatively couple with an information handling system to perform as monitors or external displays for the information handling system. The present disclosure more specifically relates to a digital display device operating in an augmented auxiliary mirror mode when the operatively coupled information handling system is not transmitting a GPU-generated video data signal to the digital display device by powering an onboard camera on the standalone digital display device and capturing, augmenting, and displaying a captured image of the user according to a selected user mode at the display panel the digital display device.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may execute machine readable code instructions of one or more software or firmware applications that cause video data to be generated and a video data signal to be provided for display at a digital display device.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
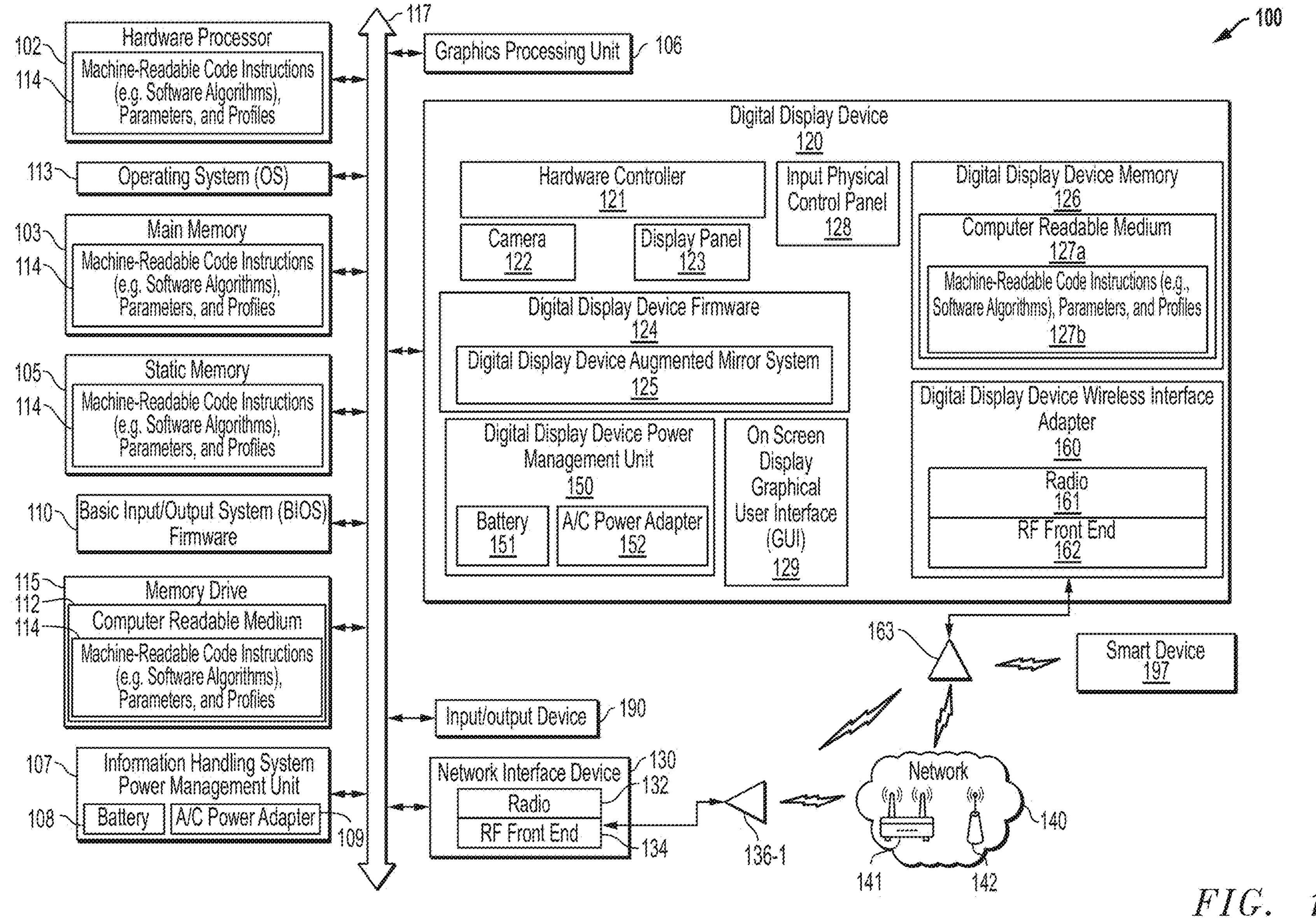
FIG. 1 is a block diagram illustrating a digital display device executing machine readable code instructions of a digital display device augmented mirror system with an onboard digital signal processing (DSP) hardware controller to display user images from an onboard camera in an auxiliary mirror mode when the operatively coupled information handling system is inactive and that is operatively coupled to an information handling system and a smart device according to an embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Digital display devices may operatively couple to information handling systems to act as monitors or external displays for the information handling systems. When operatively coupled, the digital display device may receive a graphics processing unit (GPU)-generated video data signal from such an operatively coupled information handling system executing one or more software applications or firmware code either wirelessly via a wireless interface adapter, or through a wired communication port such as a universal serial bus type-C (USB-C) port, USB 3.0 port, high definition multimedia interface (HDMI) port, DisplayPort® (DP), or mini-DP®, for example. When the information handling system is not in use, and the digital display device ceases to operate as an external display or monitor for the information handling system and receives no further GPU-generated video data signal, the digital display device may occupy room or space that may be otherwise used for other devices or apparatuses and for other purposes, such as for a mirror. The machine readable code instructions of the digital display device augmented mirror system executed at an onboard digital signal processing (DSP) controller in embodiments of the present disclosure address this issue by allowing the user to use a digital display device with onboard camera as an augmented mirror when not in use as a monitor or external display for an information handling system, and while the information handling system and its incorporated GPU are powered down or in a standby mode.

In embodiments of the present disclosure, a digital signal processing (DSP) hardware controller of the digital display device executing code instructions of firmware may identify when a GPU-generated video data signal is being received from an information handling system, and when such a signal ceases to be received, triggering a standby mode at the digital display device or powering down the digital display device. This may occur, for example, when the information handling system and its incorporated GPU are powered down or enter standby and provide no further GPU-generated video data signal to the digital display device. Upon such a detection of powering down or placement in standby mode of an operatively coupled information handling system via the DSP hardware controller executing code instructions of firmware in embodiments herein, the digital display device may be available for use in an auxiliary mirror mode. The DSP hardware controller executing machine readable code instructions of the digital display device augmented mirror system may automatically initiate an auxiliary mirror mode at the digital display device upon powering down or standby mode of the operatively coupled information handling system, or such an auxiliary mirror mode may be triggered by the user pressing a physical activation button or other input at an input physical control panel, such as a joystick panel, button panel, touch panel, touchscreen or the like at the digital display device. The DSP hardware controller of the digital display device may execute machine readable code instructions of the digital display device augmented mirror system when placed in auxiliary mirror mode to provide power from a power management unit of the digital display device to the display panel and an integrated camera of the digital display device. This may occur upon the DSP hardware controller detecting that the operatively coupled information handling system and its incorporated GPU remain powered down or in standby and not providing GPU-generated video data signals. This may occur without any interaction with the operatively coupled or previously operatively coupled information handling system in embodiments herein.

The DSP hardware controller of the digital device in embodiments may then the execute machine readable code instructions of the digital display device augmented mirror system to operate in an auxiliary mirror mode to display, via the display panel of the digital display device, an on screen display (OSD) graphical user interface (GUI) that the user may use, in combination with the input physical control panel to select from a plurality of available user modes. Such an OSD GUI may provide one or more drop-down menus, for example, that allow the user to choose from a variety of user modes, each corresponding to a different type of manipulation for a captured image of the user from the onboard camera. More specifically, the user may use the OSD GUI to choose from a plurality of available user modes, including a mirror image mode, an enhanced image mode, a zoom mode, a picture-in-picture mode, and a ring light or natural light mode in example embodiments.

While the information handling system and its incorporated GPU remain powered down or in standby with no GPU-generated video data signals sent, an image of the user may be captured, via the integrated camera onboard of the digital display device, which may be controlled and powered by the digital display device and may be positioned to capture an image of a user seated in front of the digital display device to mimic a mirror displaying an image of a user sitting in front of the mirror. The image may be as a normal capture orientation from the onboard camera or may be reversed as with viewing a mirror. If the user has selected a mirror image mode, the DSP hardware controller of the digital display device may execute machine readable code instructions of a digital display device augmented mirror system to display the captured image of the user, via the display panel, without modifying pixel values within the captured user image or with reversing the image to be viewed as a mirror image in embodiments herein. Mirror image mode may have an option to select between regular camera capture orientation or mirror image orientation in some embodiments. This may allow the digital display device to act as a traditional mirror, saving space that may otherwise be dedicated to a separate and now unnecessary inanimate mirror. If the user has selected an enhanced mode, the DSP hardware controller of the digital display device may execute machine readable code instructions of a digital display device augmented mirror system to adjust the captured image of the user to enhance contrast of the image, prior to display of that enhanced image via the display panel of the digital display device. If the user has selected a zoom mode, the DSP hardware controller of the digital display device may execute machine readable code instructions of a digital display device augmented mirror system to crop the captured image and expand the cropped image to fill the display panel, so as to zoom in on the center of the captured image, prior to display via the display panel of the digital display device. If the user has selected a picture-in-picture mode, the DSP hardware controller of the digital display device may execute machine readable code instructions of a digital display device augmented mirror system to overlay on top of or beside the displayed captured image an image depicting the current display screen in a screen image share for a paired smart device, such as a smart phone, as well as the captured image of the user via the onboard camera. If the user has selected a ring light mode, the DSP hardware controller of the digital display device may execute machine readable code instructions of a digital display device augmented mirror system to adjust the captured image to cause a ring or frame of pixels surrounding the outside edges of the display panel to emit white light or light of a pre-determined color to mimic natural light.

The digital display device in an embodiment may continue to act as such a mirror or augmented mirror until the digital display device is powered off, shifted to another user mode, or removed from standby mode due to powering on of the operatively coupled information handling system and its incorporated GPU providing GPU-generated video data signals. The DSP hardware controller for the digital display device may execute machine readable code instructions of the digital display device augmented mirror system to detect an incoming GPU-generated video data signal from an operatively coupled information handling system once the operatively coupled information handling system wakes from its standby mode or is powered on. When a GPU-generated video data signal is later received at the digital display device, upon the information handling system becoming active again, the DSP hardware controller for the digital display device may execute machine readable code instructions of firmware to switch the image displayed via the display panel to a GPU-generated video data signal incoming from information handling system. The GPU-generated video data signal automatically takes priority over the captured images directly from the onboard camera or image data from a screen share of a smart device, if any. Upon receipt of such a GPU-generated video data signal from the information handling system and switching out of standby mode, the DSP hardware controller may execute machine readable code instructions of firmware to automatically switch the image displayed by the display panel to the incoming GPU-generated video data signal, so as to avoid interruption of operation of the digital display device as a monitor or external display for the information handling system. In such a way, the digital display panel may operate in the auxiliary mirror mode to act as a traditional or augmented mirror while the information handling system is powered down and not in use, saving space that may otherwise be dedicated to a separate and now unnecessary inanimate mirror.

Turning now to the figures, FIG. 1 illustrates an information handling system 100 similar to the information handling systems according to several aspects of the present disclosure. As described herein, a digital display device 120 in an embodiment may operatively couple to an information handling system 100 to act as a monitor or external display for the information handling system 100. When operatively coupled, the digital display device 120 may receive a video data signal from such an operatively coupled information handling system 100 and generated by a GPU either wirelessly via communication between a wireless interface adapter 130 of the information handling system 100 and digital display device wireless interface adapter 160 of the digital display device 120, or through a wired communication port. Example wired communication ports may be a universal serial bus type-C (USB-C) port, USB 3.0 port, a high definition multimedia interface (HDMI) port, a DisplayPort® (DP), or mini-DP®, or others, for example. When the information handling system 100 is not in use, and the digital display device 120 ceases to operate as an external display or monitor for the information handling system 100, the digital display device 120 may occupy room or space that may be used for other devices or apparatuses and for other purposes, such as for a mirror. The digital display device augmented mirror system 125 in an embodiment may address this issue by allowing the user to use a digital display device 120 in an auxiliary mirror mode as an augmented mirror when not in use as a monitor or external display for an information handling system 100.

In an embodiment, a digital signal processing (DSP) hardware controller 121 of the digital display device 120 executing code instructions of firmware 124 may identify when a video data signal is being received from an information handling system 100, and when such a video data signal ceases to be received. When the information handling system 100 enters standby or powers down and ceases to transmit GPU-generated, this may trigger a standby mode at the digital display device 120 in an embodiment. Upon such a detection of placement in standby mode, via the DSP hardware controller 121 executing code instructions of firmware 124 in an embodiment, the DSP hardware controller 121 executing machine readable code instructions of the digital display device augmented mirror system 125 may automatically initiate an auxiliary mirror mode at the digital display device 120, or such an auxiliary mirror mode may be triggered by the user pressing an on button or activation button or provide other user input at an input physical control panel 128. Input physical control panel 128 may include buttons, touch interface, a joystick panel, touchscreen, or other input device at the digital display device 120. The DSP hardware controller 121 of the digital display device 120 may execute machine readable code instructions of the digital display device augmented mirror system 125 when placed in auxiliary mirror mode to provide power from a power management unit 150 of the digital display device 120 to the display panel 123 and an integrated camera 122 of the digital display device 120. This may occur without any interaction with the operatively coupled, or previously operatively coupled before powering down, information handling system 100 in an embodiment. It is understood herein that although powered down or in standby mode, the information handling system 100 having available wireless coupling or wired coupling with the digital display device 120 may still be referred to as operatively coupled in embodiments herein.

The integrated onboard camera 122 may be instructed to capture an image or images of a user sitting before the digital display device 120 and provide it to the DSP hardware controller executing the machine readable code instructions of the digital display device augmented mirror system to render the user image for display on the display panel 123. The captured user image is not sent to an operatively coupled information handling system 100 or prepared as an video data signal to be displayed that the digital display device 120, but instead is captured and provided directly to the DSP hardware controller for rendering and applying any augmentation according to user selected modes entirely on the digital display device 120 operating in the auxiliary mirror mode. In this way, digital display device 120 operates in the auxiliary mirror mode to render and display captured user images from the onboard camera 122 on the display panel 123 with the DSP hardware controller 121 completely independent of the operatively coupled information handling system. However, this operation of the digital display device 120 in the auxiliary mirror mode is subject to any detected of GPU-generated video data signals being reestablished or sent from the operatively coupled information handling system 100 at any time in embodiments herein.

The DSP hardware controller 121 of the digital device 120 in an embodiment may then execute machine readable code instructions of the digital display device augmented mirror system 125 to render and display, via the display panel 123 of the digital display device 120, an on screen display (OSD) graphical user interface (GUI) 129 that the user may use, in combination with the input physical control panel 128 to select from a plurality of available user modes. Such an OSD GUI 129 may provide one or more drop-down menus, for example, that allow the user to choose from a variety of user modes, each corresponding to a different type of manipulation for a captured image of the user. More specifically, the user may use the OSD GUI 129 to choose from a plurality of available user modes, including a mirror image mode, an enhanced image mode, a zoom mode, a picture-in-picture mode, and a ring light or natural light mode in various embodiments.

An image of the user may be captured, via the integrated camera 122 onboard of the digital display device 120. The integrated camera 122 in an embodiment may be controlled and powered by the digital display device 120 and may be positioned to capture an image of a user seated in front of the digital display device 120, to mimic a mirror displaying an image of a user sitting in front of the mirror. In some cases, the onboard camera 122 may capture a single user image for display via the display panel 123. In other cases, the DSP hardware controller 121 may instruct the camera 122, via execution of machine readable code instructions 127*b* of firmware 124 or digital display device augmented mirror system 125 to capture a series of user images in a video stream format for display via the display panel 123. Any manipulation of a single user image as described herein may also be applied in an ongoing manner to a series of user images captured in such a video stream format.

If the user has selected a mirror image mode, the DSP hardware controller 121 of the digital display device 120 in an embodiment may execute machine readable code instructions 127*b* of a digital display device augmented mirror system 125 to display the captured image of the user, via the display panel 123, without modifying pixel values within the captured user image and presenting the image from the onboard camera as captured. In another embodiment, when the user has selected a mirror image mode, the user may select a reversed image option such that the DSP hardware controller 121 of the digital display device 120 in an embodiment may execute machine readable code instructions 127*b* of a digital display device augmented mirror system 125 to display the captured image of the user, via the display panel 123, in a reversed left-to-right orientation such as would appear in a traditional mirror. This may allow the digital display device 120 to act as a traditional mirror with two orientation options, saving space that may otherwise be dedicated to a separate and now unnecessary inanimate mirror.

If the user has selected an enhanced mode, the DSP hardware controller 121 of the digital display device 120 may execute machine readable code instructions 127*b* of a digital display device augmented mirror system 125 to adjust the captured image of the user to enhance contrast of the image, prior to display of that enhanced image via the display panel 123 of the digital display device 120. For example, DSP hardware controller 121 of the digital display device 120 may execute machine readable code instructions 127*b* of the firmware 124 video processing system to increase contrast values across all pixels in each of a series of captured images or a single captured image to display an enhanced captured user image or series of enhanced captures user images. By displaying such an enhanced captured user image, the digital display device 120 may allow the user to better visualize certain features of the skin, eyes, nose, or mouth, for example. This may also allow for identification of problem areas via analysis by an application for a paired smart device 197, for example.

If the user has selected a zoom mode, the DSP hardware controller 121 of the digital display device 120 may execute machine readable code instructions 127*b* of a digital display device augmented mirror system 125 to crop the captured image and expand the cropped image to fill the display panel 123, so as to zoom in on the center of the captured image, prior to display via the display panel 123 of the digital display device 120. For example, the DSP hardware controller 120 in an embodiment may execute code instructions 127*b* to crop the captured user image and expand the cropped user image to fill the display panel 123, so as to zoom in on the center of the captured user image. This may provide a substantial benefit over traditional inanimate mirrors, as well as allowing the user to save space that may otherwise by occupied by such a physical object.

If the user has selected the picture-in-picture user mode, the DSP hardware controller 121 for the digital display device 120 may receive, via a wired or wireless interface adapter 160, a paired device display screen image in a screen share function from an operatively coupled smart device 197, such as a smart phone. In an embodiment, the smart device 197 may be wirelessly coupled via Wi-Fi, Bluetooth®, or near field communications to operate a screen share and share video data of the screen for the smart device. In other embodiments, such a smart device 197 may be operatively coupled to the digital display device 120 via a video data signal port, such as USB-C, USB 3.0, HDMI, DP, or mini-DP, or wirelessly, via the digital display device wireless interface adapter 160 of the digital display device 120, but is subject to the operatively coupled information handling system 100 video display data signal. Thus, the digital display device 120 may receive a video data signal comprising a plurality of images of the user's display screen for the smart device 197 in a similar type of video feed as that received from the information handling system 100 in some embodiments, but is subject to when the information handling system 100 is active and providing GPU-generated video data signals. In either embodiment, the DSP hardware controller 121 in an embodiment may execute machine readable code instructions 127*b* of the digital display device augmented mirror system 125 to display the screen share data or display data from the smart device 197 atop or beside the displayed captured user image from the onboard camera 122, as a picture-in-picture. This may allow the user to view the smart device 197 without having to look away from the display panel 123. This may be particularly useful, for example, when the user is currently using the smart device 197 to run an application that analyzes the captured images of the user to detect and treat problem areas such as dry skin, acne, ingrown hairs, rashes, or other skin complications. In one example embodiment, the captured images of the user from the onboard camera 122 may also be exchanged with the smart device 197 for analysis.

If the user has selected a ring light mode, the DSP hardware controller 121 of the digital display device 120 may execute machine readable code instructions 127*b* of a digital display device augmented mirror system 125 to adjust the captured image to cause a ring or frame of pixels surrounding the outside edges of the display panel 123 to emit white light or light of a pre-determined color to mimic natural light. The exact pixel values may be a pure white light having a red-green-blue (RGB) value of 255, 255, and 255, or may vary slightly to reflect warmer tones having lower blue and green values than 255.

The digital display device 120 in an embodiment may continue operate in the auxiliary mirror mode to act as such a mirror or augmented mirror until the digital display device 120 is powered down, shifted to another user mode, or removed from standby mode due to communication with the operatively coupled information handling system 100. The DSP hardware controller 121 for the digital display device 120 may execute machine readable code instructions of the digital display device augmented mirror system 125 to detect an incoming video data signal from the operatively coupled information handling system 100 once the information handling system 100 wakes from its standby mode or is powered on. Upon receipt of such a video data signal from the information handling system 100 and switching out of standby mode, the DSP hardware controller 121 may execute machine readable code instructions 127*b* of firmware 124 to automatically switch the image displayed by the display panel 123 to the incoming video data signal, so as to avoid interruption of operation of the digital display device 120 as a monitor or external display for the information handling system 100. The GPU-generated video data signals incoming from the operatively coupled information handling system 100 take automatic priority over the capture user images directly from the onboard camera or any screen share images from the smart device 197 by execution of machine readable code instructions of the digital display device augmented mirror system 125 at the DSP hardware controller 121. In such a way, the digital display panel 120 in the auxiliary mirror mode may act as a traditional or augmented mirror while the information handling system 100 is not in use, saving space that may otherwise be dedicated to a separate and now unnecessary inanimate mirror.

In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 141, a base station transceiver 142, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a client computer in a server-client network environment, or as a peer computer system in a peer-to-peer (or distributed) network environment. In an embodiment, the information handling system 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or plural sets, of computer readable code instructions to perform one or more computer functions, via one or more hardware processing resources.

The information handling system 100 may include main memory 103, (volatile (e.g., random-access memory, etc.), or static memory 105, nonvolatile (read-only memory, flash memory etc.) or any combination thereof), one or more hardware processing resources, such as a hardware processor 102 that may be a central processing unit (CPU), a graphics processing unit (GPU) 106, other hardware controllers, or any combination thereof. Additional components of the information handling system 100 may include one or more storage devices such as static memory 105 or drive unit 115. The information handling system 100 may include or interface with one or more communications ports for communicating with external devices, as well as one or more input/output (IO) devices 199, a video/graphics digital display device 120, or any combination thereof. Digital display devices 120 may include an external, standalone digital display device operatively coupled to the information handling system 100 in embodiments herein. Portions of an information handling system 100 may themselves be considered information handling systems 100.

The digital display device 120 may also include digital display device memory 126, (volatile (e.g., random-access memory, etc.), or static, nonvolatile (read-only memory, flash memory etc.) or any combination thereof). Digital display device 120 may include memory 126, which may be volatile or nonvolatile memory (read-only memory, flash memory etc.) or any combination thereof storing machine readable code instructions (e.g., software or firmware algorithms), parameters, and profiles 127*b* executable by the hardware controller 121. One or more hardware processing resources may also be included within digital display device 120, such as a hardware processor 121 that may be a DSP hardware controller, microcontroller, other hardware controllers, or any combination thereof. In other embodiments, the hardware controller 121 may comprise a scalar central processing unit (CPU), or timing controller (TCON).

Information handling system 100 may include devices or modules that embody one or more of the hardware devices or hardware processing resources executing machine readable code instructions for one or more systems and modules. The information handling system 100 may execute machine readable code instructions (e.g., software or firmware algorithms), parameters, and profiles 114 that may operate on servers or systems, remote data centers, or on-box in individual client information handling systems according to various embodiments herein. The digital display device 120 may execute machine readable code instructions (e.g., software or firmware algorithms), parameters, and profiles 127*b* that may operate according to various embodiments herein. In some embodiments, it is understood any or all portions of machine readable code instructions (e.g., software or firmware algorithms), parameters, and profiles 114 or 127*b* may operate on a plurality of information handling systems 100 and on digital display device 120.

The information handling system 100 may include the hardware processor 102 such as a central processing unit (CPU) or other hardware processing resources on information handling system 100 or a hardware controller 121, such as DSP hardware controller, timing controller (TCON), or other hardware controller, on the digital display device 120. Any of the hardware processing resources may operate to execute machine readable code instructions 114 or 127*b* that are either firmware or software code. The hardware controller 121 may execute machine readable digital display device firmware 124 or digital display device augmented mirror system 125 according to embodiments herein. The digital display device 120 in some embodiments may include a separate hardware controller 121, such as a DSP hardware controller, to execute machine readable code instructions 127*b* of digital display device firmware 124 or digital display device augmented mirror system 125 in embodiments herein. In such an embodiment, the digital display device 120 includes a hardware controller 121 that may comprise a DSP hardware unit, a scaler CPU, a TCON, or other on-board processor on the digital display device 120. The hardware processor 102 in the information handling system 100 may comprise a vector CPU or multi-vector CPU or may be a graphics processing unit (GPU) 106 or other hardware processing resource.

Moreover, the information handling system 100 may include memory such as main memory 103, static memory 105, and disk drive unit 115 (volatile (e.g., random-access memory, etc.), nonvolatile memory (read-only memory, flash memory etc.) or any combination thereof or other memory with computer readable medium 112 storing machine readable code instructions (e.g., software or firmware algorithms), parameters, and profiles 114 executable by the hardware processor 102, GPU 106, or any other hardware processing device. The information handling system 100 may also include one or more buses 117 operable to transmit communications between the various hardware components such as any combination of various I/O devices 199, as well as between hardware processors 102, GPU 106 or other, the operating system (OS) 113, the basic input/output system (BIOS) 110, the wireless interface adapter 130, or a radio module 132, among other components described herein. In an embodiment, the hardware processor 102, and/or GPU 106 may execute one or more bus drivers in order to transmit this data between the information handling system 100 and the input/output devices 199 described herein. As described herein, the information handling system 100 further includes a video/graphics digital display device 120. The video/graphics digital display device 120 in an embodiment may function as a liquid crystal display (LCD), an organic light emitting diode (OLED), a flat panel display, or a solid-state display. In embodiments herein, a digital display device 120 having a display screen panel 123 is described. It is appreciated that the video/graphics digital display device 120 may be wired or wireless to be one or more external video/graphics digital display devices 120 that allow a user to increase the display-viewable desktop area by extending the desktop displayed for the information handling system 100 in an embodiment. Further, the digital display device 120 may include an onboard camera 122, such as a web camera or other camera integrated therein, which may include any digital camera system such those with as charge-coupled device (CCD) or complementary metal-oxide semiconductor (CMOS) image capture systems.

A network interface device of the information handling system 100 may be wired or wireless such as shown with wireless interface adapter 130 that can provide wireless connectivity among devices such as with Bluetooth® or to a network 140, e.g., a wide area network (WAN), a local area network (LAN), wireless local area network (WLAN), a wireless personal area network (WPAN), a wireless wide area network (WWAN), or other network. In embodiments described herein, the wireless interface device 130 with its radio 132, RF front end 134 and antenna 136 is used to communicate with the network 140, via, for example, a Bluetooth® or Bluetooth® Low Energy (BLE) protocols, or other WPAN or WLAN protocols.

Further, a digital display device network interface device 160 of the digital display device 120 may be wired or wireless and can provide wireless connectivity among devices such as with Bluetooth® or to a network 140, e.g., a WAN, WWAN, LAN, WLAN, PAN, or WPAN, or other network. In embodiments described herein, the digital display device network interface device 160 with its radio 161, RF front end 162 and antenna 163 is used to communicate with the network 140, or directly with a smart device 197, via, for example, a Bluetooth® or Bluetooth® Low Energy (BLE) protocols, or other WPAN or WLAN protocols.

In an embodiment, a WAN, WWAN, LAN, and WLAN may each include an AP 141 or base station 142 used to operatively couple the information handling system 100 or the digital display device 120 to a network 140 via a wireless interface adapter 130, or a digital display device wireless interface adapter 160, respectively. In a specific embodiment, the network 140 may include macro-cellular connections via one or more base stations 142 or a wireless AP 141 (e.g., Wi-Fi), or such as through licensed or unlicensed WWAN small cell base stations 142. Connectivity may be via wired or wireless connection. For example, wireless network wireless APs 141 or base stations 142 may be operatively connected to the information handling system 100 or the digital display device 120. Wireless interface adapter 130 or digital display wireless interface adapter 160 may include one or more radio frequency (RF) subsystems (e.g., radio 132, or radio 161, respectively) with transmitter/receiver circuitry, modem circuitry, one or more antenna RF front end circuits 134 or 162, respectively, one or more wireless controller circuits, amplifiers, antennas 136 or 163, respectively and other circuitry of the radio 132 or radio 161, respectively, such as one or more antenna ports used for wireless communications via multiple radio access technologies (RATs). The radio 132 or radio 161 may communicate with one or more wireless technology protocols.

In an embodiment, the wireless interface adapter 130 or digital display wireless interface adapter 160 may operate in accordance with any wireless data communication standards. To communicate with a wireless local area network, standards including IEEE 802.11 WLAN standards (e.g., IEEE 802.11ax-2021 (Wi-Fi 6E, 6 GHZ)), IEEE 802.15 WPAN standards, WiMAX, WWAN such as 3GPP or 3GPP2, Bluetooth® standards, proprietary RF protocol, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax/be including Wi-Fi 6, Wi-Fi 6e, and the emerging Wi-Fi 7 standard. It is understood that any number of available channels may be available in WLAN under the 2.4 GHz, 5 GHZ, or 6 GHz bands which may be shared communication frequency bands with WWAN protocols or Bluetooth® protocols in some embodiments. Wireless interface adapter 130 or digital display wireless interface adapter 160 may connect to any combination of macro-cellular wireless connections including 2G, 2.5G, 3G, 4G, 5G or the like from one or more service providers. Utilization of RF communication bands according to several example embodiments of the present disclosure may include bands used with the WLAN standards and WWAN carriers which may operate in both licensed and unlicensed spectrums. The wireless interface adapter 130 or digital display wireless interface adapter 160 can represent an add-in card, wireless network interface module that is integrated with a main board of the information handling system 100 or digital display device 120, respectively, or integrated with another wireless network interface capability, or any combination thereof.

In some embodiments, one or more hardware processors or hardware controllers executing software, firmware, or dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software machine readable code instructions executable by a hardware controller or a hardware processor system. Further, in an exemplary, non-limited embodiment, implementations may include distributed hardware processing, component/object distributed hardware processing, and parallel hardware processing. Alternatively, virtual computer system processing may be constructed to implement one or more of the methods or functionalities as described herein.

The present disclosure contemplates a computer-readable medium 112 that includes machine-readable code instructions, parameters, and profiles 114 and a computer-readable medium 127*a* that includes machine-readable code instructions, parameters, and profiles 127*b* or receives and executes instructions, parameters, and profiles 114 or 127*b* responsive to a propagated signal, so that a hardware device connected to a network 140 may communicate voice, video, or data over the network 140. Further, the machine readable code instructions 114 or 127*b* may be transmitted or received over the network 140 via the network interface device or wireless interface adapter 130 or digital display wireless interface adapter 160. The present disclosure also contemplates machine-readable code instructions, parameters, and profiles 122 executing on a hardware controller 121 on-board the digital display device 120 and includes machine readable code instructions, parameters, and profiles of digital display device firmware 124 or digital display device augmented mirror system 125 to execute system and methods of the present disclosure.

The information handling system 100 may include a set of instructions 114 or digital display device firmware 124 or digital display device augmented mirror system 125 that may be executed to cause the digital display device 120 to perform any one or more of the methods or computer-based functions disclosed herein. For example, machine readable code instructions 114 may be executed by a hardware processor 102, GPU 106, or any other hardware processing resource and may include software agents, or other aspects or components used to execute the methods and systems described herein. In another example, machine readable code instructions 127*b* may be executed by a hardware controller 121 or other hardware processing resource on-board a digital display device 120 for execution of digital display device firmware 124 or digital display device augmented mirror system 125 according to parameters and instructions at the digital display device 120. Various software modules or firmware modules comprising application machine readable code instructions 114 may be coordinated by an OS 113, and/or via an application programming interface (API) include a unified device API described herein. An example OS 113 may include Windows®, Android®, and other OS types. Example APIs may include Win 32, Core Java API, or Android APIs.

In an embodiment, the information handling system 100 may include a disk drive unit 115. The disk drive unit 115 and may include machine-readable code instructions, parameters, and profiles 114 in which one or more sets of machine-readable code instructions, parameters, and profiles 114 such as firmware or software can be embedded to be executed by the hardware processor 102 or other hardware processing devices such as a GPU 106, or other microcontroller unit to perform the processes described herein. Similarly, main memory 103 and static memory 105 may also contain a computer-readable medium for storage of one or more sets of machine-readable code instructions, parameters, or profiles 114 described herein. The disk drive unit 115 or static memory 105 also contain space for data storage. Further, the machine-readable code instructions, parameters, and profiles 114 may embody one or more of the methods as described herein. In a particular embodiment, the machine-readable code instructions, parameters, and profiles 114 may reside completely, or at least partially, within the main memory 103, the static memory 105, and/or within the disk drive 115 during execution by the hardware processor 102, or GPU 106 of information handling system 100.

The digital display device 120 may include digital display device memory 126, which may include machine-readable code instructions, parameters, and profiles 127*b* in which one or more sets of machine-readable code instructions, parameters, and profiles 127*b* such as firmware or software can be embedded to be executed by the hardware controller 121, or other microcontroller unit to perform the processes described herein. The digital display device memory 126 may also contain space for data storage. Further, the machine-readable code instructions, parameters, and profiles 127*b* may embody one or more of the methods as described herein. In a particular embodiment, the machine-readable code instructions, parameters, and profiles 127*b* may reside completely, or at least partially, within the digital display device memory 126 during execution by the hardware controller 121 of the digital display device 120.

Main memory 103, digital display device memory 126, or other memory of the embodiments described herein may contain computer-readable medium (not shown), such as RAM in an example embodiment. An example of main memory 103, or digital display device memory 126 includes random access memory (RAM) such as static RAM (SRAM), dynamic RAM (DRAM), non-volatile RAM (NV-RAM), or the like, read only memory (ROM), another type of memory, or a combination thereof. Static memory 105, or digital display device memory 126 may contain computer-readable medium (not shown), such as NOR or NAND flash memory in some example embodiments. The applications and associated APIs, for example, may be stored in static memory 105 or on the disk drive unit 115 that may include access to a machine-readable code instructions, parameters, and profiles 114 such as a magnetic disk or flash memory in an example embodiment. Digital display device firmware 124, or digital display device augmented mirror system 125, for example, may be stored in digital display device memory 126 in computer readable medium 127*a* that may include access to a machine-readable code instructions, parameters, and profiles 127*b* such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 107 (a.k.a. a power supply unit (PSU)). The PMU 107 may include a hardware controller and executable machine-readable code instructions to manage the power provided to the components of the information handling system 100 such as the hardware processor 102 and other hardware components described herein. The PMU 107 may control power to one or more components including the one or more drive units 115, the hardware processor 102 (e.g., CPU), the GPU 106, a video/graphic digital display device 120, or other wired I/O devices 199 and other components that may require power when a power button has been actuated by a user. In an embodiment, the PMU 107 may monitor power levels and be electrically coupled to the information handling system 100 to provide this power. The PMU 107 may be coupled to the bus 117 to provide or receive data or machine-readable code instructions. The PMU 107 may regulate power from a power source such as the battery 108 or AC power adapter 109. In an embodiment, the battery 108 may be charged via the AC power adapter 109 and provide power to the components of the information handling system 100, via wired connections as applicable, or when AC power from the AC power adapter 109 is removed.

The digital display device 120 in an embodiment may also include a separate and fully autonomous digital display device power management unit (PMU) 150. The digital display device PMU 150 may include a hardware controller and executable machine-readable code instructions to manage the power provided to the components of the digital display device 120, such as the display device hardware controller 121, camera 122, display panel 123, input physical control panel 128, digital display device memory 126, digital display device wireless interface adapter 160, and other hardware components that may require power when a power button has been actuated by a user. In embodiments herein, the display device hardware controller 121 may be a DSP controller. In an embodiment, the digital display device PMU 150 may provide such power independently of the information handling system 100 at times, especially when a video data signal from the information handling system 100 is not currently being received at the digital display device 120. The digital display device PMU 150 may regulate power from a power source such as the battery 151 or AC power adapter 152. In an embodiment, the battery 151 may be charged via the AC power adapter 152 and provide power to the components of the digital display device 120, via wired connections as applicable, or when AC power from the AC power adapter 152 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium 112 or 127*a* can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2A:
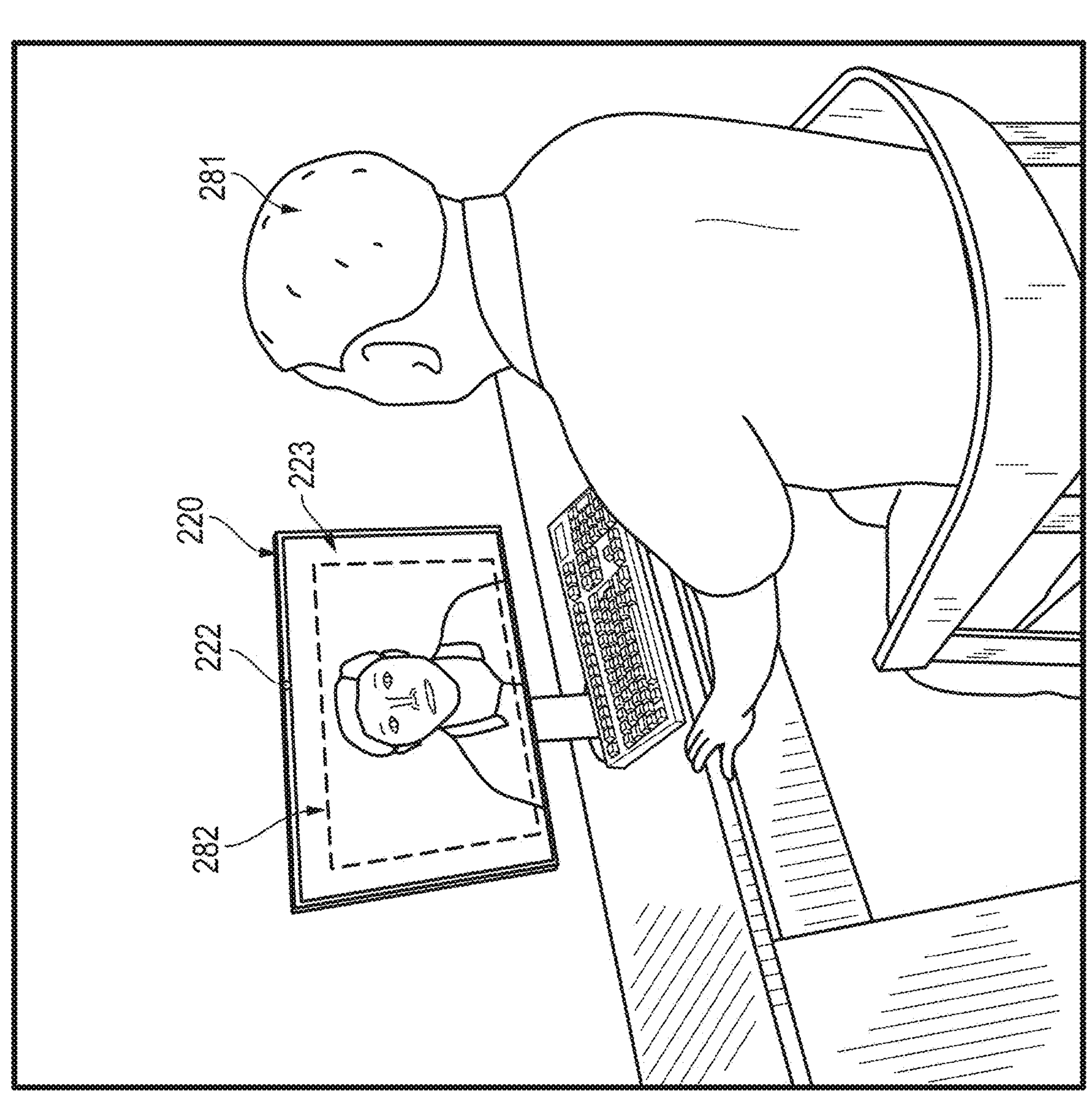
FIG. 2A is a graphical diagram illustrating a digital display device displaying a captured user image from an onboard camera in an auxiliary mirror mode, as augmented according to a selected mirror image or enhanced mode when an operatively coupled information handling system is inactive according to an embodiment of the present disclosure.

FIG. 2A is a graphical diagram illustrating a digital display device operating in an auxiliary mirror mode displaying a captured user image when an operatively coupled information handling system is inactive according to a selected mirror image mode or enhanced mode according to an embodiment of the present disclosure. In one example embodiment in which the user 281 has selected a mirror image mode via user input to an OSD GUI, the digital signal processing (DSP) hardware controller of the digital display device 220 may execute machine readable code instructions of a digital display device augmented mirror system to render and display the image 282 of the user 281 in the auxiliary mirror mode Image 282 may be rendered and displayed by the DSP hardware controller as captured by an onboard integrated camera 222 that is powered and controlled by the digital display device 220, via the display panel 223, without modifying pixel values within the captured user image 281. In another embodiment, the user may select left-to-right orientation or reverse orientation of the captured image from the onboard camera 222 to render and provide an display of the image of the user as captured by the onboard camera 222 or render and display the image reversed as would appear in a traditional mirror. This selection between left-to-right orientation or reverse orientation may be made via the OSD GUI by the user. Thus, the digital display device 220 operating in auxiliary mirror mode may act as a traditional mirror without access or resources used at the operatively coupled information handling system, saving space that may otherwise be dedicated to a separate and now unnecessary inanimate mirror.

In another example embodiment, in which the user 281 has selected the enhanced user mode, the DSP hardware controller of the digital display device 220 may execute machine readable code instructions of the digital display device augmented mirror system to increase contrast in pixel values for the captured user image to generate an enhanced captured user image 282. The DSP hardware controller of the digital display device 220 in such an embodiment may execute machine readable code instructions of the digital display device augmented mirror system to render and display the enhanced captured image 282 via the display panel 223 operating in auxiliary mirror mode. By displaying such an enhanced captured user image 282, the digital display device 220 may allow the user to better visualize certain features of the skin, eyes, nose, or mouth, for example. This may also allow for identification of problem areas via analysis by an application for a paired smart device, for example. The digital display device 220 in embodiments herein may continue to operate in auxiliary mirror mode and act as such a mirror until the digital display device 220 is powered down, shifted to another user mode, or removed from standby mode due to communication of video signal data from the operatively coupled information handling system.

Figure 2B:
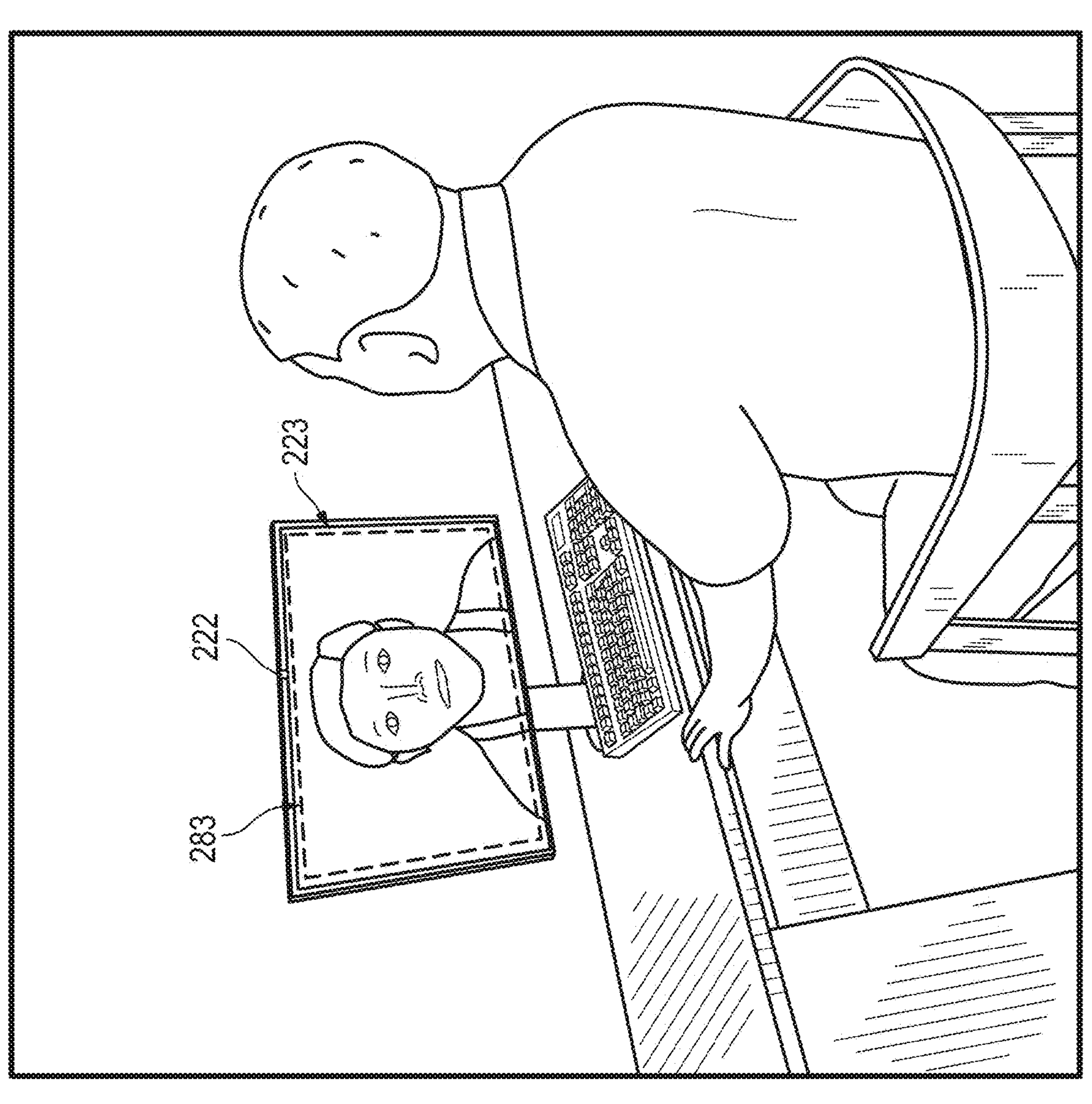
FIG. 2B is a graphical diagram illustrating a digital display device displaying a captured user image from an onboard camera in an auxiliary mirror mode, as augmented according to a selected zoom mode when an operatively coupled information handling system is inactive according to an embodiment of the present disclosure.

FIG. 2B is a graphical diagram illustrating a digital display device operating in an auxiliary mirror mode and displaying a captured user image when an operatively coupled information handling system is inactive according to a selected zoom user mode according to an embodiment of the present disclosure. In an embodiment in which the user has selected the zoom user mode, the digital signal processing (DSP) hardware controller of the digital display device may execute machine readable code instructions of the digital display device augmented mirror system to generate and render a zoomed in captured image 283 by expanding a portion of the captured image to occupy the full display panel 223 while operating in an auxiliary mirror mode. For example, the DSP hardware controller in an embodiment may execute code instructions to crop the captured user image and expand and render the cropped user image to fill the display panel 223 so as to zoom in on the center or another portion of the captured user image. Selection of a portion of the captured user image to zoom in on may be selected by inputs to an input physical control panel, such as via buttons or a joystick, or via a touch surface or touchscreen at the digital display device 220 in some embodiments. The DSP hardware controller of the digital display device in an embodiment may execute machine readable code instructions of the digital display device augmented mirror system to display the zoomed-in user image 283 via the display panel 223 when in auxiliary mirror mode. This may provide a substantial benefit over traditional inanimate mirrors, as well as allowing the user to save space that may otherwise by occupied by such a physical object.

Figure 2C:
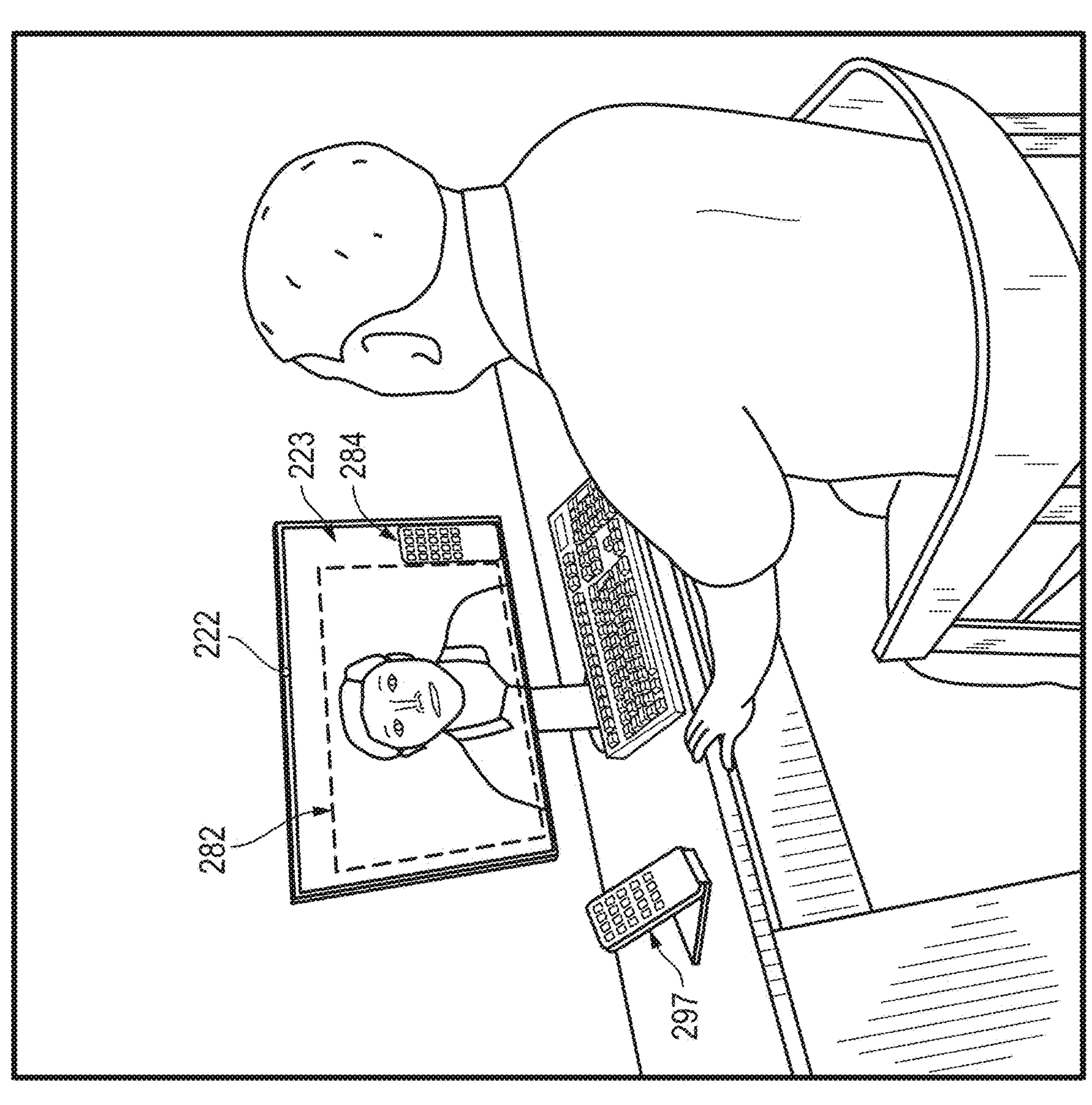
FIG. 2C is a graphical diagram illustrating a digital display device displaying a captured user image from an onboard camera in an auxiliary mirror mode, as augmented according to a selected picture-in-picture mode when an operatively coupled information handling system is inactive according to an embodiment of the present disclosure.

FIG. 2C is a graphical diagram illustrating a digital display device operating in an auxiliary mirror mode and displaying a captured user image when an operatively coupled information handling system is inactive, as augmented according to a selected picture-in-picture user mode according to an embodiment of the present disclosure. In an embodiment in which the user has selected to the picture-in-picture user mode, the digital signal processing (DSP) hardware controller for the digital display device may receive, via a wired or wireless interface adapter, a paired device display screen image from an operatively coupled smart device 297, such as a smart phone. This may be shared from the smart device 297 via a screenshare function in example embodiments. The DSP hardware controller in an embodiment may execute machine readable code instructions of the digital display device augmented mirror system to display the paired device display screenshare image 284 atop or beside the displayed captured user image 282 from the onboard camera 222 as a picture-in-picture display. This may allow the user to view the smart device 297 without having to look away from the display panel 223. This may be particularly useful, for example, when the user is currently using the smart device 297 to run an application that analyzes the captured user images 282 of the user to detect and treat problem areas such as dry skin, acne, ingrown hairs, rashes, or other skin complications. In an embodiment, the captured user image 282 from the onboard camera 222 may be exchanged with or shared with the smart device 297 for analysis of that captured user image 282, such as for analysis by a software application on the smart device 297.

Figure 2D:
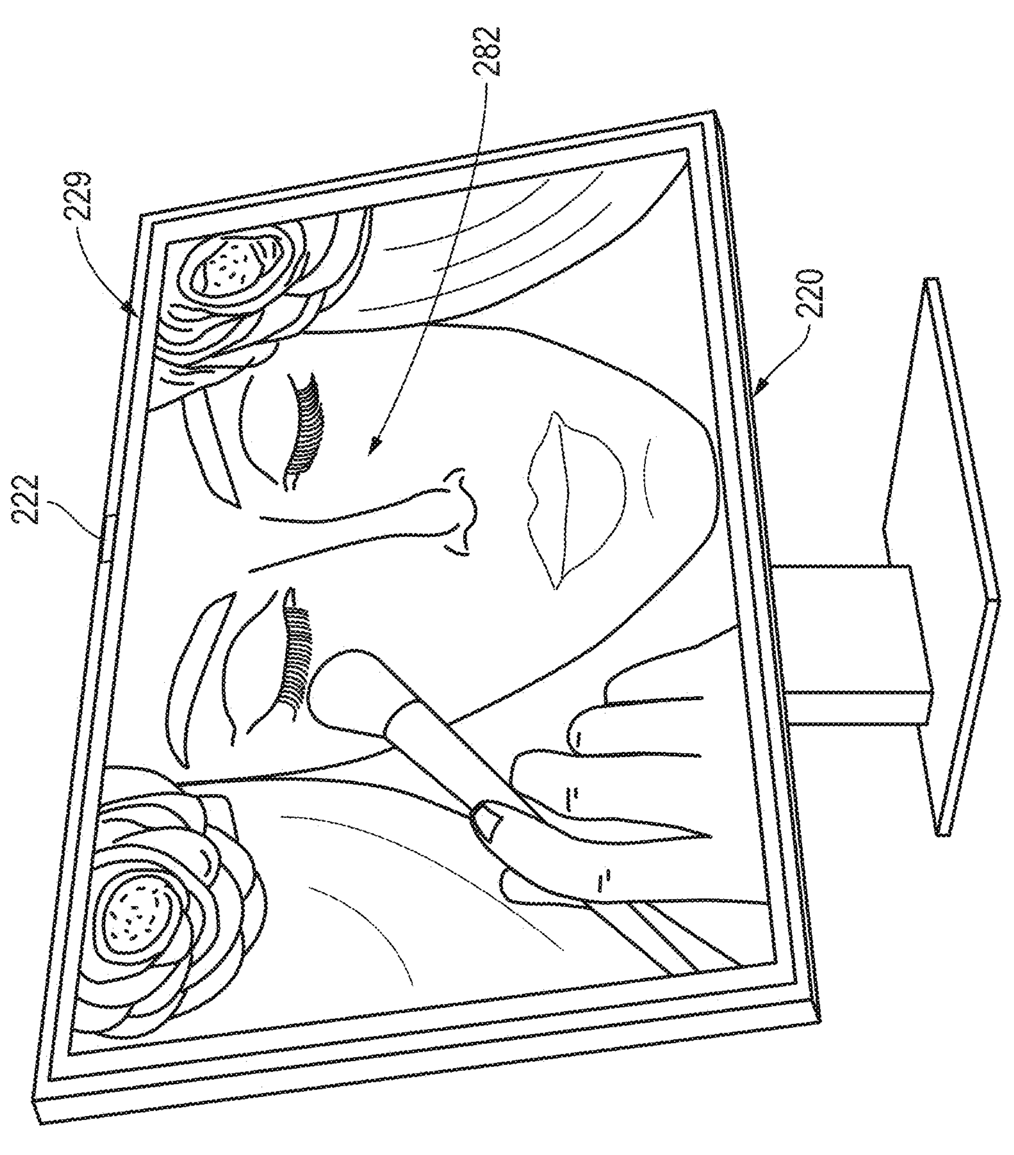
FIG. 2D is a graphical diagram illustrating a digital display device displaying a captured user image from an onboard camera in an auxiliary mirror mode, as augmented according to a selected ring light mode when an operatively coupled information handling system is inactive according to an embodiment of the present disclosure.

FIG. 2D is a graphical diagram illustrating a digital display device operating in auxiliary mirror mode and displaying a captured user image when an operatively coupled information handling system is inactive, as augmented according to a selected ring light user mode according to an embodiment of the present disclosure. In an embodiment in which the user has selected the ring light user mode, the digital signal processing (DSP) hardware controller for the digital display device 220 may execute machine readable code instructions of digital display device augmented mirror system to display the captured user image 282 from the onboard camera 222 with a ring or frame of pixels 229 surrounding the captured user image 282 displaying white or natural light. For example, the captured user image 282 directly from the onboard camera 222 within the digital display device 220 may be adjusted by the DSP hardware controller executing machine readable code instructions of the digital display device augmented mirror system to reduce the size of the captured user image 282 on the display screen and to cause a ring or frame of pixels 229 surrounding the outside edges of the display panel to emit white light or light of a pre-determined color to mimic natural light. More specifically, the exact pixel values may be a pure white light having a red-green-blue (RGB) value of 255, 255, and 255, or may vary slightly to reflect warmer tones having lower blue and green values than 255.

Figure 3:
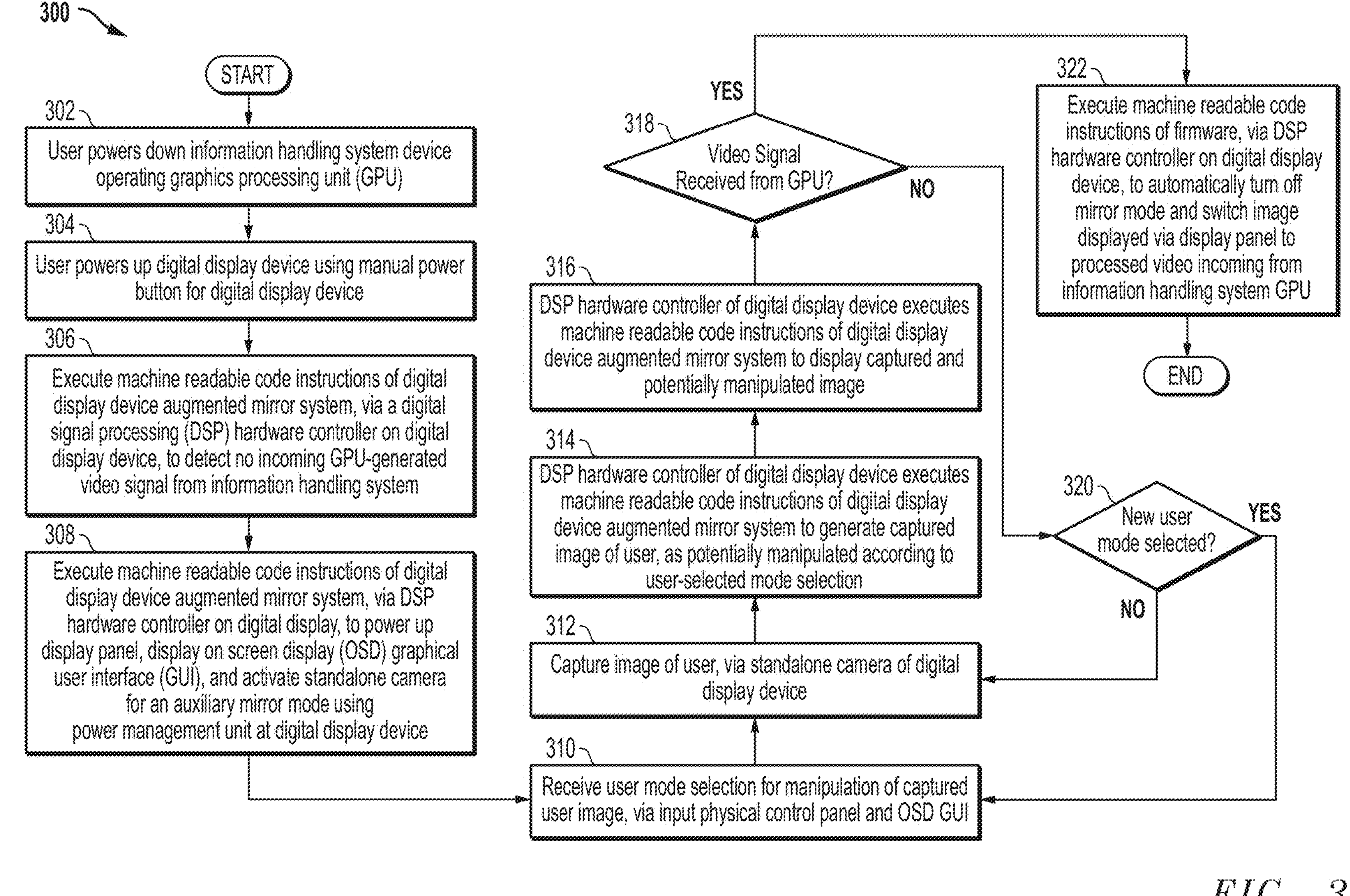
FIG. 3 is a flow diagram illustrating a method of displaying user images executing machine readable code instructions of a digital display device augmented mirror system via a digital display panel from an onboard camera in an auxiliary mirror mode, as augmented according to a selected user mode when an operatively coupled information handling system is inactive according to an embodiment of the present disclosure.

FIG. 3 is a flow diagram illustrating a method of displaying user images captured by a camera powered and controlled onboard a standalone digital display device via a digital display panel when an operatively coupled information handling system is inactive according to an embodiment of the present disclosure. As described herein, standalone digital display devices may operatively couple to information handling systems to act as monitors or external displays for the information handling systems. When operatively coupled, the digital display device may receive a video data signal generated by a graphics processing unit (GPU) of such an operatively coupled information handling system either wirelessly via a wireless interface adapter, or through a wired communication port when the operatively coupled information handling system is on and operating. When the information handling system is not in use, the digital display device ceases to operate as an external display or monitor for the information handling system. The standalone digital display device may occupy room or space, such as on a desk or in an office, that may be otherwise used for other devices or apparatuses and for other purposes, such as for a mirror. The digital display device augmented mirror system executing at the digital display device in an embodiment of the present disclosure may address this issue by allowing the user to use a standalone digital display device as an augmented mirror when not in use as a monitor or external display for an information handling system.

At block 302 in an embodiment, a user may power down an information handling system operating a graphics processing unit (GPU) that is operatively coupled to the digital display device. Thus, the GPU may also be powered down. In some embodiments, the information handling system with GPU may enter a standby mode such that the GPU does not generate or transmit a video data signal to the digital display device. As described herein, the digital display device in embodiments may comprise a standalone, external monitor for an extended desktop view for an information handling system, or a laptop computer. In some other embodiments, the auxiliary mirror mode of embodiments herein may be applied to a digital display device of a laptop information handling system that also incorporates a keyboard and input/output device such as a trackpad. In various embodiments described herein, the digital display device may be operatively coupled to the information handling system executing code instructions of one or more software or firmware applications via a GPU to generate a video data signal. However, this digital display device, such as a standalone digital display device may not be capable of controlling the GPU to generate such a video data signal when the information handling system executing an operating system has been powered down or enters a standby mode. In each of these embodiments, powering down the information handling system or entering a standby mode may further cause the digital display device to power down.

In an embodiment at block 304, the user may power up the digital display device using a manual power button for the digital display device. For example, the user depressing a physical button of the digital display device on an input physical control panel, such as a joystick panel, may activate a display device PMU and prompt the DSP hardware controller for the digital display device to come out of standby mode and to power an integrated, standalone camera and the display panel using a power management unit at the digital display device in embodiments herein. This may occur without any interaction with the operatively coupled information handling system and using power controlled solely by the digital display device itself. In other embodiments, the digital display device may not have powered down and a physical input control panel may include an auxiliary mirror mode activation button or other input to activate the DSP hardware controller to execute machine readable code instructions of the digital display device augmented mirror system to operate in the auxiliary mirror mode of embodiments described herein.

At block 306, a digital signal processing (DSP) hardware controller for a digital display device in an embodiment may execute machine readable code instructions of a digital display device augmented mirror system to detect cessation of an incoming video data signal from a GPU at an operatively coupled information handling system and actuation of an auxiliary mirror mode or power to the digital display device from a input physical control panel. The information handling system in such an embodiment may be operatively coupled to the digital display device, via a wired port such as universal serial bus type-C (USB-C), or via any number of proprietary video communications protocol ports, such as high definition multimedia interface (HDMI), DisplayPort® (DP), or mini-DP®. The digital display device may receive a GPU-generated video data signal from the operatively coupled information handling system via any of these ports, or via a wireless interface device in the case where the information handling system is coupled to the digital display device via a wireless link. Firmware of the digital display device augmented mirror system executing on the DSP hardware controller at the digital display device, may monitor for when such a GPU-generated video data signal from the information handling system is received. When receipt of such a GPU-generated video data signal from the operatively coupled information handling system has ceased or is not present, the digital display device augmented mirror system executing on the DSP hardware controller may initiate an auxiliary mirror mode with an onboard camera and display panel at the standalone digital display device. In another example embodiment, the DSP hardware controller of the digital display device may execute machine readable code instructions of the firmware to active the standalone digital display device from a standby mode when a GPU-generated video data signal is no longer received from the information handling system to initiate the auxiliary mirror mode with the digital display device augmented mirror system.

The DSP hardware controller for the digital display device in an embodiment at block 308 may execute machine readable code instructions of the digital display device augmented mirror system to provide power to the display panel. This may further include activation of an integrated, standalone camera onboard of the digital display device, via a power management unit of the digital display device. In addition, the DSP hardware controller may execute machine readable code instructions of the digital display device augmented mirror system to generate and display an on screen display (OSD) graphical user interface (GUI) at the digital display device. Upon powering up of the display panel, the OSD GUI may be displayed to assist the user in selecting among user mode options within the auxiliary mirror mode for the display of captured images of the user to allow the digital display device to act as an augmented mirror for the user. This may occur while the information handling system, GPU, and operating system thereof are powered down or are in a standby mode and not providing a video data signal.

At block 310, a user mode selection may be received in an embodiment via a physical control panel of the digital display device, such as a joystick, toggle buttons, touch interface, touchscreen, or other types of input physical controls, for example. The user in an embodiment may manipulate the physical control panel or other input physical controls, in an embodiment, to navigate one or more menus of the OSD GUI to select from a plurality of available user modes. The OSD GUI may provide one or more drop-down menus, for example, that allow the user to choose from a variety of user modes, each corresponding to a different type of manipulation for a captured image of the user. More specifically, the user in an example embodiment may use the OSD GUI to choose from a plurality of available user modes, including a mirror image mode, an enhanced image mode, a zoom mode, a picture-in-picture mode, and a ring light or natural light mode.

An image of the user may be captured in an embodiment at block 312, via the integrated standalone camera of the digital display device. The standalone camera in an embodiment may be controlled and powered by the digital display device, independent of the information handling system, and may be positioned to capture an image of a user seated in front of the digital display device, to mimic a mirror displaying an image of a user sitting in front of the mirror. The DSP hardware controller of the digital display device may execute code instructions of the digital display device augmented mirror system in an embodiment to activate the standalone camera and capture one or more user images. In some cases, the standalone camera may capture a single user image for display via the display panel. In other cases, the DSP hardware controller may instruct the camera to capture a series of user images in a video stream format for display via the display panel. Any manipulation of a single user image as described herein may also be applied in an ongoing manner to a series of user images captured in such a video stream format. The provide onboard camera provides the captured user image or images directly to the DSP hardware controller executing the machine readable code instructions of the digital display device augmented mirror system to render the user image for display on the display panel at the digital display device. In this way, the digital display device does not rely on the operatively coupled information handling system in any way to process the captured user image or images when operating in the auxiliary mirror mode and is instead self-contained within the digital display device providing for an auxiliary function for the digital display device in embodiments herein.

At block 314, the DSP hardware controller of the digital display device may execute machine readable code instructions of the digital display device augmented mirror system to render and generate a captured image of the user, as potentially manipulated according to the received user-selected mode selection, for display at the display panel of the digital display device. For example, and as described in greater detail with respect to FIG. 4 below, the captured image of the user may be modified or manipulated to zoom in to the center of the image, combine the captured image with a display screen of another paired device, such as a smart phone, adjust a ring of pixels surrounding the captured image to display white light, or to adjust contrast of the captured image, as dictated according to the user selection of zoom, picture-in-picture, ring light, or enhance modes. In another example embodiment, the user may select the auxiliary mirror mode, which may not require any manipulation or adjustment of the captured image from the onboard camera.

The DSP hardware controller of the digital display device in an embodiment at block 316 may execute machine readable code instructions of the digital display device augmented mirror system to render and display the captured and potentially manipulated image at the display panel as controlled and rendered via the DSP hardware controller onboard the digital display device, but subject to video display data being received from an operatively coupled information handling system should it be powered up or released from standby mode. For example, the DSP hardware controller of the digital display device may execute machine readable code instructions of the digital display device augmented mirror system to render and display an unaltered version of the captured image from the onboard camera when the digital display device is operating in a user-selected auxiliary mirror mode. In another example, the DSP hardware controller of the digital display device may execute machine readable code instructions of the digital display device augmented mirror system to display a zoomed-in, picture-in-picture, white-light-ringed, or high-contrast version of the captured image when operating in zoom, picture-in-picture, ring light, or enhance mode, as described in greater detail below with respect to FIG. 4.

At block 318, the DSP hardware controller executing machine readable code instructions of the digital display device augmented mirror system determines, in an embodiment, whether the digital display device has begun receiving a GPU-generated video data signal from the information handling system. This may occur, for example, if the user powers up the information handling system, causing a need to switch the standalone digital display device from the auxiliary mirror mode described above to the display of the GPU-generated video data signal received from the operatively-coupled information handling system. If such a GPU-generated video data signal is being received from the information handling system, the method may proceed to block 322 for DSP hardware controller executing machine readable code instructions of the digital display device augmented mirror system to switch modes at the digital display device. If such a GPU-generated video data signal is not being received from the information handling system, either through a wired port or a wireless network interface device, the method may proceed to block 320 where DSP hardware controller executing machine readable code instructions of the digital display device augmented mirror system to determine whether the standalone digital display device is still powered on without the operatively coupled information handling system being powered on to provide video data signals from a GPU.

In an embodiment at block 320 in which a GPU-generated video data signal is not being received from the information handling system, the DSP hardware controller executing machine readable code instructions of the digital display device augmented mirror system determines whether the standalone digital display device is still powered on or whether the auxiliary mirror mode is still selected in embodiments herein. Where the DSP hardware controller executing machine readable code instructions of the digital display device augmented mirror system determines that the digital display device is no longer powered on or that the auxiliary mirror mode is no longer selected as active, then the method may end. Where the DSP hardware controller executing machine readable code instructions of the digital display device augmented mirror system determines that the digital display device is still powered on and the auxiliary mirror mode is still active, then the method may proceed to block 322 to determine if a new user mode selection is received at the digital display device augmented mirror system.

At block 322, where it is determined that the digital display device is still powered on and the auxiliary mirror mode is still active, the DSP hardware controller executing machine readable code instructions of the digital display device augmented mirror system determines whether user mode selection input for a new user mode selection is received at the digital display device augmented mirror system. Where the user has provided a new user mode selection at block 322, flow proceeds to block 310. The user mode selection provided at block 310 via the input physical control panel and the OSD GUI, the method may prompt a change in the ways, if any, at block 312 as before in which captured images may be manipulated through execution by the DSP hardware controller of the digital display device executing machine readable code instructions of the digital display device augmented mirror system return. For example, the user may switch from any of the mirror, zoom, picture-in-picture, ring light, or enhance modes described in greater detail below with respect to FIG. 4, to another of these user mode selections. If a new user mode has been selected, the method may proceed back to block 310 for receipt of such a selection at the digital display device augmented mirror system, and for ongoing capture and manipulation of user images, as described herein. If a new user mode has not been selected, the method may proceed back to block 312 for continued capture and manipulation of user images according to the previous user selected mode, via the standalone camera of the digital display device, operating independently from the currently powered down information handling system. By repeating the loop between blocks 310 or 312 and 320, the digital display device executing machine readable code instructions of the digital display device augmented mirror system may continuously display captured and potentially manipulated images of a user (as dictated by a user mode selection that may be adjusted over time) while an operatively coupled information handling system is powered down.

Returning to block 318, in an embodiment in which a GPU-generated video data signal is being received from the information handling system, such as would occur if the information handling system were powered on, the method proceeds to block 324. At block 324, the DSP hardware controller of the digital display device may execute machine readable code instructions of firmware to automatically turn off auxiliary mirror mode for the digital display device and to switch the image displayed via the display panel to the GPU-generated video data signal incoming from the information handling system. Upon receipt of such a GPU-generated video data signal from the information handling system, such as when switching out of standby mode, the DSP hardware controller may execute machine readable code instructions of firmware to automatically switch the image displayed by the display panel to the incoming video data signal, so as to avoid interruption of operation of the digital display device as a monitor or external display for the information handling system. In such a way, the digital display panel may act as a traditional or augmented mirror system while the information handling system is not in use, saving space that may otherwise be dedicated to a separate and now unnecessary inanimate mirror. The method for displaying user images via a digital display panel when an operatively coupled information handling system is inactive may then end.

Figure 4:
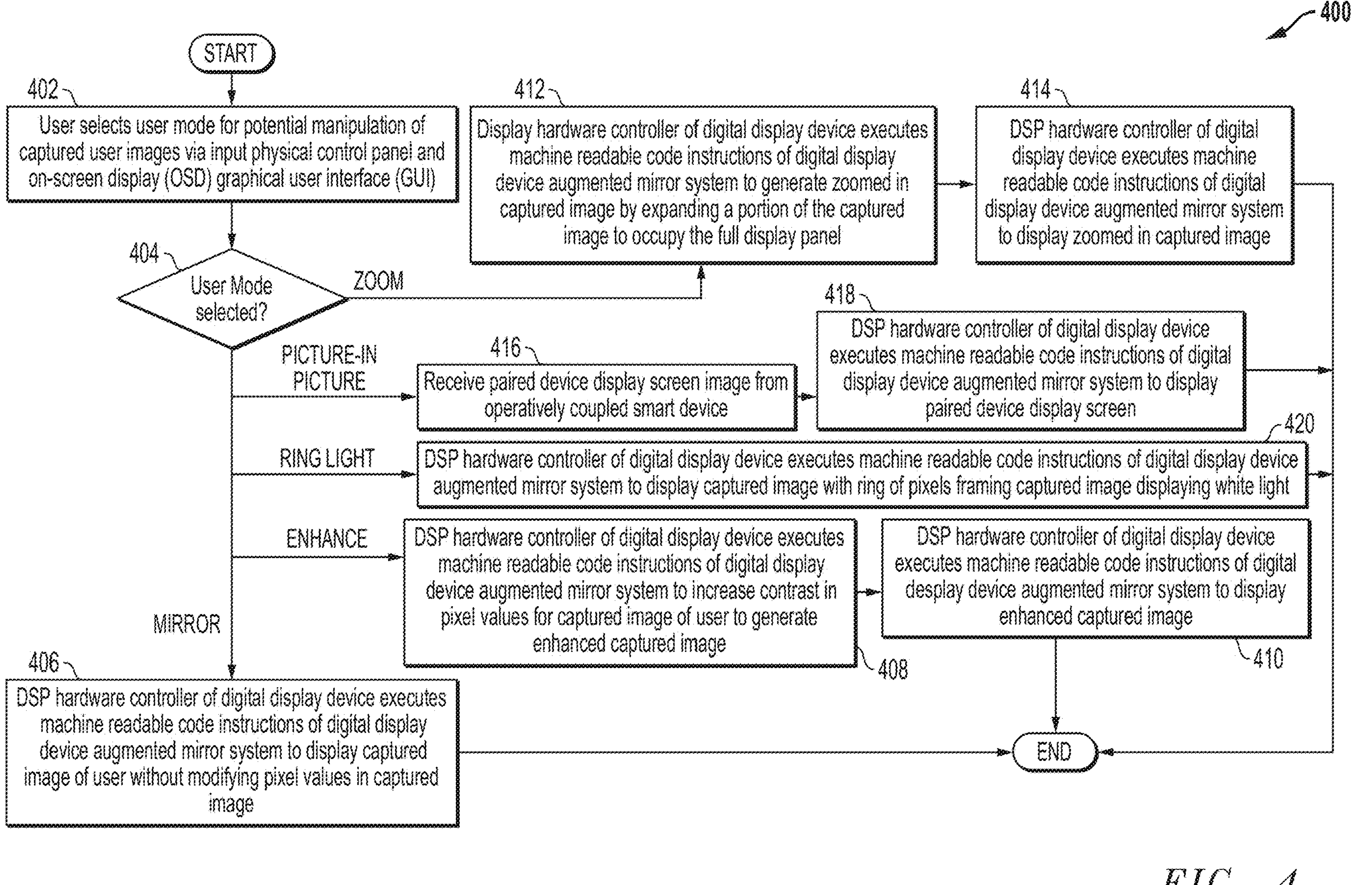
FIG. 4 is a flow diagram illustrating a method of receiving a selected user mode for displaying user images executing machine readable code instructions of a digital display device augmented mirror system via a digital display panel from an onboard camera when an operatively coupled information handling system is inactive according to an embodiment of the present disclosure.

FIG. 4 is a flow diagram illustrating a method of displaying user images, with augmentation or as captured, at a digital display panel under one or more selected user modes of an on-board mirror identified via a physical control panel input and an on screen display (OSD) graphical user interface (GUI) of the digital display device according to an embodiment of the present disclosure. As described herein, when the information handling system is not in use and provides no video data signal, and the digital display device ceases to operate as an external display or monitor for the information handling system, the digital display device may allow the user to actuate an auxiliary mirror mode to use a digital display device as an augmented mirror conditional on no video data signal being received from the GPU of the operatively coupled information handling system.

At block 402, the DSP hardware controller for the digital display device in an embodiment may execute machine readable code instructions of the digital display device augmented mirror system to determine that no video data signal is received from an operatively coupled information handling system and that an auxiliary mirror mode function is selected by a user or automatically initiated with powering the digital display device. The DSP hardware controller for the digital display device executes machine readable code instructions of the digital display device augmented mirror system to generate and display an on-screen display (OSD) graphical user interface (GUI) presenting user selectable modes for the auxiliary mirror mode operation on the display panel of the digital display device. The user in an embodiment may select a user mode for display and potential manipulation of captured user images, via an input physical control panel and the OSD GUI. For example, and as described in greater detail above with respect to block 310 of FIG. 3, he user in an example embodiment may use a joystick, toggle buttons, touch interface, touchscreen or other physical control panel and the OSD GUI on the display panel to choose from a plurality of available user modes. Example available user modes for the auxiliary mirror mode operation include a mirror image mode, an enhanced image mode, a zoom mode, a picture-in-picture mode, and a ring light or natural light mode in various embodiments herein.

The DSP hardware controller for the digital display device in an embodiment at block 404 may execute machine readable code instructions of the digital display device augmented mirror system receives user mode selection input to determine which of the plurality of available user modes displayed via the OSD GUI that the user has selected at block 402. If the user has selected a mirror image mode without adjustment, the method may proceed to block 406 for display of the captured image of the user without alteration of the image by the DSP hardware controller executing machine readable code instructions. If the user has selected an enhanced mode, the method may proceed to block 408 for adjusting the captured image of the user to enhance contrast of the image, prior to display of that enhanced image via the display panel of the digital display device. If the user has selected a zoom mode, the method may proceed to block 412 for execution of code instructions by the DSP hardware controller to crop the captured image and expand the cropped image to fill the display panel, so as to zoom in on the center of the captured image, prior to display via the display panel of the digital display device. If the user has selected a picture-in-picture mode, the method may proceed to block 416 for execution of code instructions by the DSP hardware controller to overlay on top of the displayed captured image an image depicting the current display screen for a paired smart device, such as a smart phone. If the user has selected a ring light mode, the method may proceed to block 420 for adjusting the captured image to cause a ring or frame of pixels surrounding the outside edges of the display panel to emit white light or light of a pre-determined color to mimic natural light.

In an embodiment at block 406 in which the user has selected a mirror image mode, the DSP hardware controller of the digital display device may execute machine readable code instructions of a digital display device augmented mirror system to render and display the captured image of the user, via the display panel, without otherwise modifying pixel values within the captured user image from the onboard camera at the digital display device. This may allow the digital display device to act as a traditional mirror, saving space that may otherwise be dedicated to a separate and now unnecessary inanimate mirror. The digital display device in an embodiment may continue to act in such an auxiliary mirror mode and render image data from the onboard camera until the digital display device is powered down, shifted to another user mode, or the operatively coupled information handling system is powered up or removed from standby mode due and communicates a video data signal from a GPU at the operatively coupled information handling system, as described in greater detail above with respect to FIG. 3. The method for displaying user images from an onboard camera, with augmentation or as captured, at a digital display panel of a digital display device when no video data signal is actively being sent from an operatively coupled information handling system may then end.

At block 408, in an embodiment in which the user has selected the enhanced user mode, the DSP hardware controller of the digital display device may execute machine readable code instructions of the digital display device augmented mirror system to increase contrast in pixel values for the captured user image to generate an enhanced captured user image. For example, DSP hardware controller of the digital display device may execute machine readable code instructions of the firmware video processing system to render pixels from the captured images from the onboard camera with increased contrast values across all pixels in each of a series of the captured images or a single captured image to display an enhanced captured user image or series of enhanced captures user images on the display panel.

The DSP hardware controller of the digital display device in an embodiment at block 410 may execute machine readable code instructions of digital display device augmented mirror system to display the enhanced captured image. By displaying such an enhanced captured user image, the digital display device may allow the user to better visualize certain features of the skin, eyes, nose, or mouth, for example. This may also allow for identification of problem areas via analysis by an application for a paired smart device, for example. The method for displaying user images from an onboard camera, with augmentation or as captured, at a digital display panel of a digital display device when no video data signal is actively being sent from an operatively coupled information handling system may then end.

At block 412, in an embodiment in which the user has selected the zoom user mode, the DSP hardware controller of the digital display device may execute machine readable code instructions of the digital display device augmented mirror system to generate a zoomed in captured image by expanding a portion of the captured image to occupy the full display panel. For example, the DSP hardware controller in an embodiment may execute code instructions to crop the captured user image and expand the cropped user image to fill the display panel and magnify the portion, so as to zoom in on the center of the captured user image.

The DSP hardware controller of the digital display device in an embodiment at block 414 may execute machine readable code instructions of the digital display device augmented mirror system to display the zoomed-in user image generated at block 412. This may provide a substantial benefit over traditional inanimate mirrors, as well as allowing the user to save space that may otherwise by occupied by such a physical object, as described in greater detail above with respect to FIG. 3. The method for displaying user images from an onboard camera, with augmentation or as captured, at a digital display panel of a digital display device when no video data signal is actively being sent from an operatively coupled information handling system may then end.

At block 416, in an embodiment in which the user has selected to the picture-in-picture user mode, the DSP hardware controller for the digital display device may receive, via a wired or wireless interface adapter, a paired device display screen image from an operatively coupled smart device, such as a smart phone. Although the primary, operatively coupled information handling system is off or in standby mode, it may still take priority over the smart device and onboard camera images if turned on and sending video data signals from its GPU. Such a smart device may be operatively coupled to the digital display device via a video data signal port, such as USB-C, USB 3.0, HDMI, DP, or mini-DP, or wirelessly via the wireless interface adapter of the digital display device. Thus, the digital display device may receive a video data signal comprising a plurality of images of the user's display screen for the smart device in a video feed, such as image mirroring, as well as image data from the onboard camera at the digital display device.

The DSP hardware controller in an embodiment at block 418 may execute machine readable code instructions of the digital display device augmented mirror system to display the paired device display screen and the captured user image, as a picture-in-picture. Either may be a primary image data displayed in a background, while the other image data is displayed in a box image on the display panel. For example, the smart device video feed from image mirroring may be the primary, background image and image data from the onboard camera may be inset in a box on the display screen, or vice versa. In yet other embodiments, image data from the smart device video feed such as from image mirroring and the video data from the image data from the onboard camera may be presented side by side or in other various arrangement of windows on the display screen. This may allow the user to view the smart device without having to look away from the display panel. Further, in some embodiments, the image data from the onboard camera may be shared with or transmitted to the smart device. This may be particularly useful, for example, when the user is currently using the smart device to run an application that analyzes the captured images of the user to detect and treat problem areas such as dry skin, acne, ingrown hairs, rashes, or other skin complications. The method for displaying user images from an onboard camera, with augmentation or as captured, at a digital display panel of a digital display device when no video data signal is actively being sent from an operatively coupled information handling system may then end.

At block 420, in an embodiment in which the user has selected the ring light user mode, the DSP hardware controller for the digital display device may execute machine readable code instructions of the digital display device augmented mirror system to display the captured image with a ring or frame of pixels surrounding the captured image displaying white or natural light. For example, the captured image may be adjusted to cause a ring or frame of pixels surrounding the outside edges of the display panel to emit white light or light of a pre-determined color to mimic natural light. More specifically, the exact pixel values may be a pure white light having a red-green-blue (RGB) value of 255, 255, and 255, or may vary slightly to reflect warmer tones having lower blue and green values than 255. The method for displaying user images from an onboard camera, with augmentation or as captured, at a digital display panel of a digital display device when no video data signal is actively being sent from an operatively coupled information handling system may then end.

The blocks of the flow diagram of FIGS. 3 and 4 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those capable in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A standalone digital display device executing machine readable code instructions of a digital display device augmented mirror system comprising:

- a manual power button for the standalone digital display device to power on the standalone digital display device independently from an operatively coupled information handling system, and while the information handling system is powered down;
- a digital signal processing (DSP) hardware controller to execute machine readable code instructions of a digital display device augmented mirror system to detect an absence of incoming graphics processing unit (GPU)-generated video data signal from the operatively-coupled information handling system;
- the DSP hardware controller to execute machine readable code instructions to display an on screen display (OSD) graphical user interface (GUI) via a display panel, and activate an onboard camera and a display panel using a power management unit at the standalone digital display device for an auxiliary mirror mode operation of the digital display device;
- an input physical control panel for receiving a user mode selection from a plurality of user modes displayed via the OSD GUI;
- the stand-alone camera to capture a user image and provide the user image to the DSP hardware controller executing the machine readable code instructions of the digital display device augmented mirror system to render the user image for display on the display panel; and
- the display panel to display the user image rendered by the DSP hardware controller.

2. The standalone digital display device of claim 1, wherein the user mode selection is a mirror image display to display the user image as captured by the onboard camera.

3. The standalone digital display device of claim 1, wherein the user mode selection is a mirror image display to display the user image in a reverse orientation from the user image captured by the onboard camera.

4. The standalone digital display device of claim 1, wherein the user mode selection is an enhanced image mode with heightened contrast and the DSP hardware processor renders the enhanced user image for display with the heightened contrast.

5. The standalone digital display device of claim 1, wherein the user mode selection is a ring light mode and the DSP hardware processor renders the user image for display in a smaller set of pixels on the display panel and illuminates a ring of pixels at the perimeter of the display panel to display white or natural colored light.

6. The standalone digital display device of claim 1, wherein the user mode selection is a zoomed image and the DSP hardware processor renders a sub-portion of the user image across the pixels of the display panel to increase resolution of the sub-portion of the user image and not display the remaining portions of the user image.

7. The standalone digital display device of claim 1, wherein the user mode selection is a picture-in-picture mode to display a screenshare image received from a smart device operatively coupled to the digital display device in addition to the user image captured at the onboard camera on the display panel.

8. The standalone digital display device of claim 1 further comprising:

- the DSP hardware controller to execute machine readable code instructions of the digital display device augmented mirror system to detect receipt of the incoming GPU-generated video data signal from the operatively-coupled information handling system; and
- the DSP hardware controller to automatically switch to display images pursuant to the incoming GPU-generated video data signal received from the operatively coupled information handling system and cease display of the user image captured from the onboard camera.

9. A standalone digital display device executing machine readable code instructions of a digital display device augmented mirror system comprising:

- a manual power button for the standalone digital display device to power on the standalone digital display device independently from an operatively coupled information handling system, and while the information handling system is powered down;
- a digital signal processing (DSP) hardware controller to execute machine readable code instructions of a digital display device augmented mirror system to detect an absence of incoming graphics processing unit (GPU)-generated video data signal from the operatively-coupled information handling system;

the DSP hardware controller receiving a user selection for initiating an auxiliary mirror mode of the digital display device;

the DSP hardware controller to execute machine readable code instructions to activate an onboard camera and a display panel using a power management unit at the standalone digital display device for an auxiliary mirror mode operation of the digital display device;

the onboard camera to capture a user image and provide the user image to the DSP hardware controller executing the machine readable code instructions of the digital display device augmented mirror system to render the user image for display on the display panel;

the display panel to display the user image rendered by the DSP hardware controller; and the DSP hardware controller to execute machine readable code instructions of the digital display device augmented mirror system to detect receipt of the incoming GPU-generated video data signal from the operatively-coupled information handling system and to automatically switch to display images pursuant to the incoming GPU-generated video data signal received from the operatively coupled information handling system and cease display of the user image captured from the onboard camera.

10. The standalone digital display device of claim 9 further comprising:

the DSP hardware controller to execute machine readable code instructions to display, via a display panel, an on screen display (OSD) graphical user interface (GUI); and an input physical control panel or the display panel having a touchscreen for receiving a user mode selection from a plurality of user modes displayed via the OSD GUI.

11. The standalone digital display device of claim 9 further comprising:

the DSP hardware controller to execute machine readable code instructions to display, via a display panel, an on screen display (OSD) graphical user interface (GUI); and the DSP hardware controller to receive a user mode selection from a plurality of user modes displayed via the OSD GUI, wherein the user mode selection is a mirror image display and a second user mode selection causes the user image to be displayed as captured by the onboard camera and a third user mode selection causes user image to be displayed in a reverse orientation from the user image captured by the onboard camera.

12. The standalone digital display device of claim 9 further comprising:

the DSP hardware controller to execute machine readable code instructions to display, via a display panel, an on screen display (OSD) graphical user interface (GUI); and the DSP hardware controller to receive a user mode selection from a plurality of user modes displayed via the OSD GUI, wherein the user mode selection is an enhanced image with heightened contrast and the DSP hardware processor renders the enhanced user image for display with the heightened contrast.

13. The standalone digital display device of claim 9 further comprising:

the DSP hardware controller to execute machine readable code instructions to display, via a display panel, an on screen display (OSD) graphical user interface (GUI); and the DSP hardware controller to receive a user mode selection from a plurality of user modes displayed via the OSD GUI, wherein the user mode selection is a ring light mode and the DSP hardware processor renders the user image for display in a smaller set of pixels on the display panel and illuminates a ring of pixels at the perimeter of the display panel to display white or natural colored light.

14. The standalone digital display device of claim 9 further comprising:

the DSP hardware controller to execute machine readable code instructions to display, via a display panel, an on screen display (OSD) graphical user interface (GUI); and the DSP hardware controller to receive a user mode selection from a plurality of user modes displayed via the OSD GUI, wherein the user mode selection is a zoomed image and the DSP hardware processor renders a sub-portion of the user image across the pixels of the display panel to increase resolution of the sub-portion of the user image and not display the remaining portions of the user image.

15. The standalone digital display device of claim 9 further comprising:

the DSP hardware controller to execute machine readable code instructions to display, via a display panel, an on screen display (OSD) graphical user interface (GUI); and the DSP hardware controller to receive a user mode selection from a plurality of user modes displayed via the OSD GUI, wherein the user mode selection is a picture-in-picture mode to display a screenshare image received from a smart device operatively coupled to the digital display device in addition to the user image captured at the onboard camera on the display panel.

16. A digital display device executing machine readable code instructions of a digital display device augmented mirror system comprising:

a manual power button for the digital display device to power on the standalone digital display device independently from an operatively coupled information handling system, and while the information handling system is powered down;

a digital signal processing (DSP) hardware controller to execute machine readable code instructions of a digital display device augmented mirror system to detect an absence of incoming graphics processing unit (GPU)-generated video data signal from the operatively-coupled information handling system;

the DSP hardware controller to execute machine readable code instructions to display an on screen display (OSD) graphical user interface (GUI) via a display panel, and activate an onboard camera and a display panel using a power management unit at the digital display device for an auxiliary mirror mode operation of the digital display device;

the DSP hardware controller receiving a user mode selection from a plurality of user modes displayed via the OSD GUI;

the onboard camera to capture a user image and provide the user image to the DSP hardware controller executing the machine readable code instructions of the digital display device augmented mirror system to render the user image for display on the display panel; and the display panel to display the user image rendered by the DSP hardware controller.

17. The digital display device of claim 16 further comprising:

the DSP hardware controller to execute machine readable code instructions of the digital display device augmented mirror system to detect receipt of the incoming GPU-generated video data signal from the operatively-coupled information handling system; and the DSP hardware controller to automatically switch to display images pursuant to the incoming GPU-generated video data signal received from the operatively coupled information handling system and cease display of the user image captured from the onboard camera.

18. The digital display device of claim 16, wherein the digital display device is a standalone digital display device.

19. The digital display device of claim 16 further comprising:

an input physical control panel or the display panel having a touchscreen for receiving the user mode selection from the plurality of user modes displayed via the OSD GUI.

20. The digital display device of claim 16, further comprising:

the plurality of user modes for the auxiliary mirror mode operation include a mirror image display to display the user image as captured by the onboard camera or in reverse orientation, an enhanced image mode with heightened contrast and the DSP hardware processor renders the enhanced user image for display with the heightened contrast, and a ring light mode and the DSP hardware processor renders the user image for display in a smaller set of pixels on the display panel and illuminates a ring of pixels at the perimeter of the display panel.

* * * * *